United States Patent [19]
Barr et al.

[11] Patent Number: 5,524,936
[45] Date of Patent: Jun. 11, 1996

[54] TORQUE TIGHT LOCKING DEVICE

[75] Inventors: Thomas A. Barr; Christopher V. Barr; James C. Elliott; Dirk A. Frew, all of Albuquerque, N.M.

[73] Assignee: Control Systems, Inc., Rio Rancho, N.M.

[21] Appl. No.: 501,682

[22] Filed: Jul. 12, 1995

[51] Int. Cl.⁶ .................................................... F16L 35/00
[52] U.S. Cl. ............................ 285/39; 285/90; 285/92; 285/93; 285/328; 285/353; 411/120
[58] Field of Search .................... 285/92, 39, 93, 285/328, 353, 90; 411/119, 120, 121

[56]                References Cited
           U.S. PATENT DOCUMENTS

| 315,895   | 4/1885  | Brady .       |
|-----------|---------|---------------|
| 2,190,076 | 2/1940  | Love .        |
| 5,139,289 | 8/1992  | Koss .        |
| 5,222,768 | 6/1993  | Hofer et al. .|
| 5,312,139 | 5/1994  | Marks et al. .|
| 5,350,201 | 9/1994  | Bynum .       |
| 5,362,111 | 11/1994 | Harbin .      |
| 5,388,866 | 2/1995  | Schlosser .   |
| 5,466,014 | 11/1995 | Cummings ................ 285/92 |

OTHER PUBLICATIONS

Cajon Brochure, No. Ca–792, Sep. 1994 entitled VCR Metal Gasket FaceSeal Fittings, pp. 1 and 2.

*Primary Examiner*—Dave W. Arola

[57]                ABSTRACT

A locking device for preventing relative rotation of pre-torqued compression nuts used in face seal mechanical fittings includes an inner member having a cavity sized to slide onto and non-rotatably enclose the male or first nut of the fitting, an outer member having a first cavity sized to rotatably receive the inner member and a second cavity sized to slide onto and non-rotatably enclose the female or second nut of the fitting, and at least one set screw projecting inwardly through a threaded borehole in the outer member to non-rotatably engage and lock the inner member.

15 Claims, 2 Drawing Sheets

TORQUE TIGHT LOCKING DEVICE

BACKGROUND OF THE INVENTION

1. Technical Field

The present invention relates to fluid distribution face seal connections and, more particularly, to locking devices to prevent relative rotation between compression nuts used to enclose face seal attachments.

2. Discussion of the Prior Art

Face seal mechanical fittings are employed in many industrial and research applications. They provide a quick and convenient way to join tubing in fluid distribution systems. These connections sometimes develop leaks in service due to improper makeup, mechanical action on the connection, especially torquing up stream or down stream, and many other reasons. When the connection loosens, leaks are possible. In many applications, even very small leaks can cause process problems, and in some cases, severe safety hazards. This is especially true in applications involving UHP (Ultra High Purity) gases or hazardous materials.

A number of devices have been developed to minimize the effects of mechanical vibration on these face seals, particularly to prevent the relative rotation between securing nuts that result in loosening of the compression and ultimately in compromise of the connection. Locking wires passing through fine holes drilled in one or both of the compression nuts, then tied together or into surrounding structure afford improvement, but fail to provide a positive mechanical lock and require cumbersome preparation and installation.

Another approach, exemplified by U.S. Pat. No. 5,362,111 (Harbin), incorporates a U-shaped flat spring having a serrated edged aperture formed in one of two facing surfaces, sized to nonrotatably engage the points of a first polygonal compression nut, and a second aperture formed in the second facing surface to engage similarly a second compression nut, with or without a clutching pattern on one aperture. A fluid line nut locking device exemplified by U.S. Pat. No. 5,222,768 (Hofer et al) uses a similar approach with two separate box wrenches sized to engage two compression nuts and locked nonrotatably together with a bolt passing through tabs inwardly extending from the two wrenches toward one another. Each of these devices inconveniently requires disassembly of the compression fitting for removal.

U.S. Pat. No. 5,312,139 (Marks et al) is similar to the Hofer patent with slots formed in each of the box wrenches to permit passage of the fluid line while still affording engagement of the compression nuts to allow the device to be retrofit onto existing fittings without requiring disassembly thereof. Rotational adjustment between the two compression nuts is limited by the engagement surfaces formed between the nut points and flats and those of the corresponding wrench apertures.

Semicircular spring bands, serrated to form gripping surfaces to engage compression nuts are joined by at least one axial bridge or bar to oppose relative nut rotation in U.S. Pat. No. 5,350,201 (Bynum). The resilience required to permit snap fitting of this device over the nuts limits the rigidity of connection necessary for hazardous and ultra high purity fluid connections. None of these prior art locking devices assures a rigid positive non-rotating connection between precisely spaced compression nuts while at the same time allowing assembly and disassembly of the locking members without requiring detachment of the fluid face seal.

OBJECTS AND SUMMARY OF THE INVENTION

Accordingly, it is a primary objective of the present invention to provide a locking device to hold hex nuts in fixed relative rotational position.

It is a further object of the present invention to prevent face seals in ultra high purity gas line connections from loosening and leaking.

It is also an object of the present invention to provide a device that will render accidental disassembly of a hex to hex mechanical connection virtually impossible.

The aforesaid objects are achieved individually and in combination and it is not intended that the invention be construed as requiring that two or more of said objects be combined.

In accordance with the present invention, an inner member having an open-sided hex cavity, is fit tightly over the male hex nut of a pretorqued mechanical hex to hex connection, an outer member having a first cavity sized to rotatably receive the inner member and an open-sided hex cavity adjacent to the first cavity sized to fit tightly over the connection female hex, is fit over the inner member and female hex nut. Set screws extending inwardly through the outer member into the inner member are advanced inwardly to lock the two members and consequently two hex nuts into non-rotatable relation with each other.

The present invention provides a light, compact, inexpensive and easily installed device for providing a positive lock to prevent two hex nuts from turning with respect to each other.

The above and still further objects, features and advantages of the present invention will become apparent upon considering the following detailed description of preferred embodiments thereof, particularly when viewed in connection with the accompanying drawings wherein like reference numerals in various figures are used to designate like components.

DESCRIPTION OF THE PREFERRED EMBODIMENT

Figure 1:
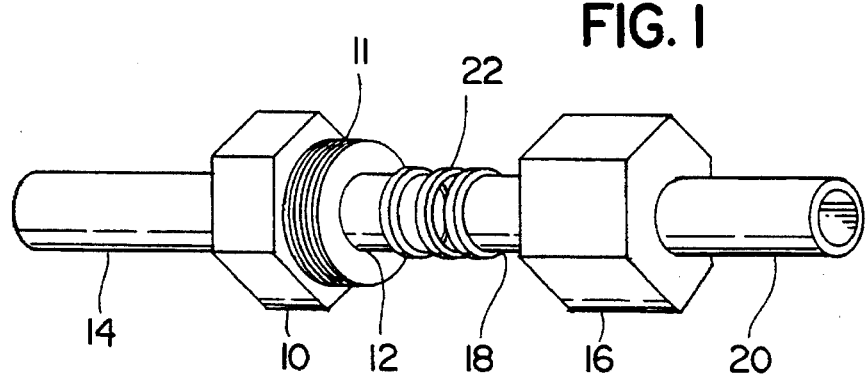
FIG. 1 is an exploded view in perspective of a typical face seal mechanical fitting.
Figure 2:
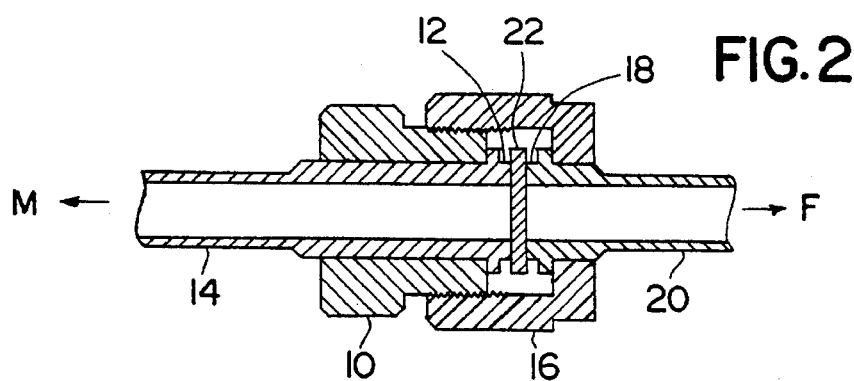
FIG. 2 is a cross-sectional view of an assembled face seal fitting.

Referring to FIGS. 1 and 2, a typical face seal mechanical fitting comprises a male first nut 10 having an externally threaded axial projection 11 coaxially surrounding a male side face gland 12 formed in a first tube 14. An internally threaded second or female nut 16 coaxially surrounds a female side face gland 18 formed in a second tube 20. A gasket 22 is inserted between the two mutually present faces of the respective face glands. Tightening of the two nuts compresses the gasket between the two face glands to form a tight seal between the two joined tube ends. Any relative loosening rotation between the two compression nuts results in a relaxation of the seal and consequent fluid leakage.

For clarity and consistency of the following description, geometry will be defined with reference to the male direction and female direction of the seal as shown in FIGS. 1 and 2. The male direction extends from the seal through the first or male compression nut axially along first tube 14 and the female direction extends from the seal axially through the second or female compression nut along second tube 20 as indicated by the arrows marked M and F, respectively, in FIG. 2.

The locking device of the present invention, shown in FIGS. 3–6, comprises an inner cover member 26 and an outer cover member 28, formed of, for instance, aluminum, and one or more locking set screws 30, preferably made of a harder material than the members, such as stainless steel.

Inner cover member or sleeve 26 has a first end 32 facing toward the male direction and a second end 34 facing in the female direction. A first cavity 36 is defined in the first end 32 of inner cover member 26 to fit non-rotatably over male or first nut 10, usually hexagonal in shape, and is provided with an open or slotted side 38 sized to permit the inner cover member to slide onto male or first nut 10. A second open-sided cavity 40 is defined in the second end 34 of inner cover member 26 in radial alignment with and extending to first cavity 36. The second cavity has a diameter across the generally semicircular closed end somewhat larger than the diameter of the externally threaded portion 11 of male nut 10, yet smaller than the minor diameter of the nut, thus forming a shoulder 42 between the two cavities. The thickness of shoulder 42 is sized to correspond to an ideal gasket compression thickness and acts as a spacer between the two compression nuts to control minimum spacing therebetween and prevent over-compression.

Figure 7:
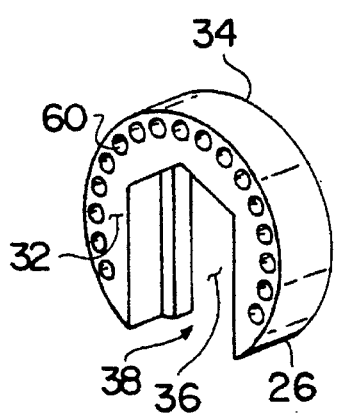
FIG. 7 is a view in perspective of the alternate inner member of the present invention.

Alternately, cavity 36 can be made to extend completely through inner cover member or sleeve 26, eliminating second cavity 40 as shown in FIG. 7, and, in turn, eliminating shoulder 42. In this simpler embodiment of the inner member, no inherent spacing mechanism is provided between the male and female nuts, advantageously allowing more universal applicability of the device on a wide variety of fittings, at the loss, however, of the positive assurance of preselected spacing.

Outer cover member or sleeve 28 has a first end 44 on the male side and a second end 46 on the female side. A first cavity 48, defined in the first end 44 of outer cover sleeve 28 is sized to rotatably receive inner cover member 26, and is provided with an open or slotted side 50. A second cavity 52 extending from outer cover member second or female end 46 to first cavity 48 is defined in the second end of outer cover or sleeve 28 to fit non-rotatably over female or second nut 16, also usually hexagonal, and is provided with an open or slotted side 54 in radial alignment with the open side of inner cover cavity 48 and sized to permit the member to slide onto female second nut 16.

At least one through hole 49 extends through outer cover member 28 into cavity 48 and is threaded to receive a locking set screw 30.

In use the first or male nut 10 is torqued into the second or female nut 16 drawing male gland 12 and female gland 18 into compressive seal against gasket 22. Predetermined optimum torquing force is applied to properly set the seal. The open or slotted side 38 of the inner cover member 26 according to the present invention is then placed over male nut 10, and inner cover member 26 slides into non-rotatable alignment over the male nut. The slot or open side 52 of outer cover member 28 is placed over the female second nut 16 on the female side of inner cover 26, and outer cover member 28 slides into non-rotatable alignment with the female nut. Outer cover member 28 is then displaced axially toward and over inner cover member 26 slidably and rotatably receiving inner cover member 26 into cavity 48. Set screws 30 are advanced through bore holes 49 in outer cover member 28 into compressive contact against the outer surface of inner cover member 26 to lock outer cover member 28 and inner cover member 26 and consequently female nut 16 and male nut 10, rigidly non-rotatably together to maintain the preset optimum compression on the seal.

Figure 8:
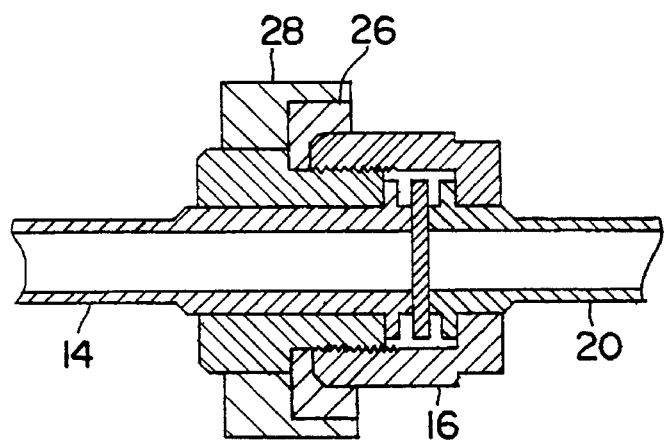
FIG. 8 is a view in cross-section of a second embodiment of the present invention.

It is to be understood that the design of the present locking device is not limited to the embodiment illustrated in FIGS. 3–7 in which the inner cover member 26 captures the male or first nut 10 and the outer cover member 28 both captures the female or second nut 16 and receives the inner cover member. In a second embodiment shown in FIG. 8, the inner cover member 26 is sized to receive the female nut 16 and the outer cover member 28 is sized to receive the male nut 10.

Figure 3:
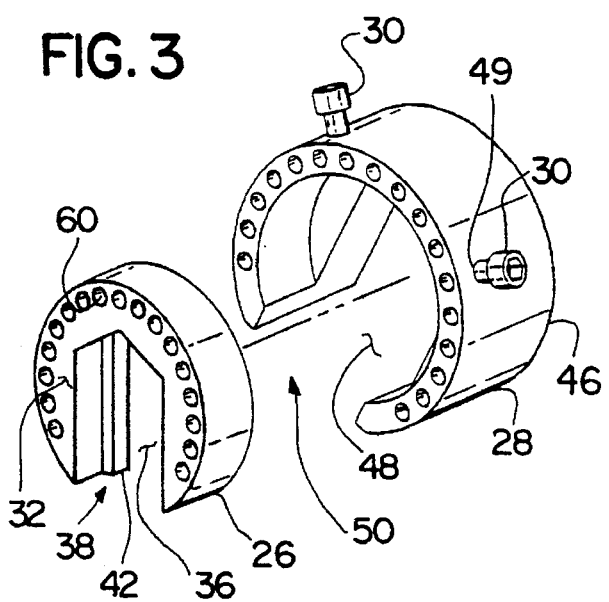
FIG. 3 is an exploded view in perspective of a locking device according to the present invention viewed from the male hex nut side.
Figure 4:
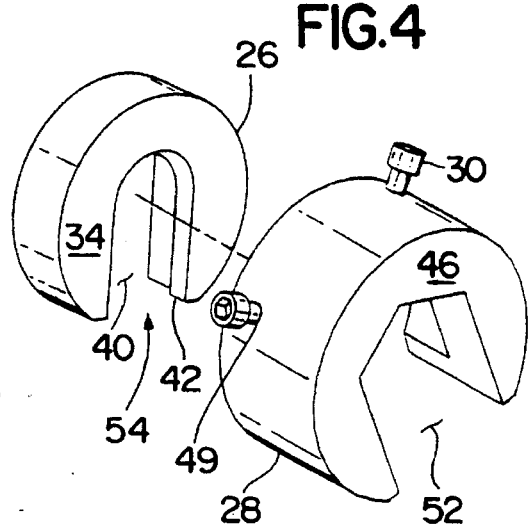
FIG. 4 is an exploded view in perspective of the locking device of FIG. 3 viewed from the female hex nut side.
Figure 5:
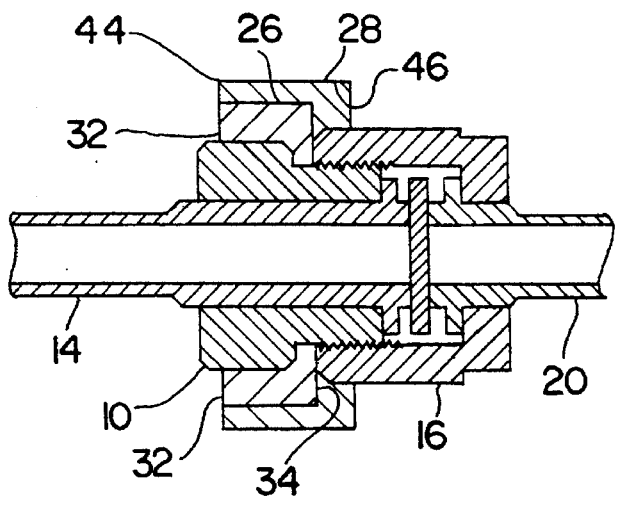
FIG. 5 is a view in cross-section of a locking device according to the present invention installed on a typical face seal connection.
Figure 6:
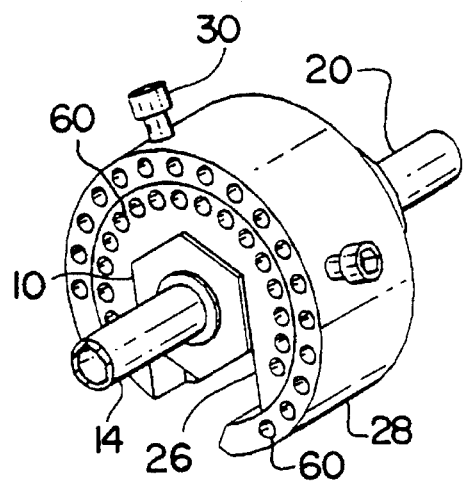
FIG. 6 is a view in perspective of an installed locking device according to the present invention viewed from the male hex nut side of a connection.

The exposed ends 34 and 46 of inner and outer cover members 26 and 28, respectively, may have patterns of small recesses 60, as shown in FIGS. 3, 6 and 7 adapted to receive prongs of a torquing tool to allow one or both compression nuts to be rotated for adjustment while encased in the locking device. Similarly, such recesses or other scribings formed on the member faces can be used to provide visual adjustment cues and indications during the tightening procedure of the relative separation between the female and male nuts and consequently the seal compression.

In view of the foregoing, it is apparent that the present invention provides an anti-rotation locking device to prevent relative rotation and consequent loosening of a face seal formed between male and female compression nuts. The capability to slide onto and off of an undisturbed assembled fitting and the unlimited adjustment positions that can be assumed between the two locking members of the present invention provides versatile and retrofittable security for face seal fittings of all sorts.

While specific embodiments of the present invention have been shown and described, it will be obvious to those skilled in the art that changes and other modifications may be made without departing from this invention.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A torque tight locking device to prevent relative rotation between first and second nuts in a face seal assembly joining separate fluid transmission lines, said locking device comprising:

an inner member having opposed first and second ends and having a first nut cavity therebetween sized to non-rotatably receive the face seal assembly first nut, said first nut cavity having an open side sized to slidably receive said first nut;

an outer member having opposed first and second ends and having a first cavity in said first end sized to rotatably receive said inner member, said outer member having a second cavity extending from said second end to said outer member first cavity, said outer member second cavity sized to non-rotatably receive the face seal assembly second nut, said outer member second cavity having an open side to slidably receive said second nut;

at least one locking set screw extending inwardly through a threaded borehole in said outer member abutting against said inner member to non-rotatably lock said outer member and said inner member.

2. The torque tight locking device of claim 1 wherein said inner member is aluminum.

3. The torque tight locking device of claim 1 wherein said outer member is aluminum.

4. The torque tight locking device of claim 1 wherein said at least one set screw is steel.

5. The torque tight locking device of claim 1 wherein said inner member first nut cavity is shaped to non-rotatably receive a hexagonal nut.

6. The torque tight locking device of claim 1 wherein said outer member second nut cavity is shaped to non-rotatably receive a hexagonal nut.

7. The torque tight locking device of claim 1 wherein said inner member has a partially cylindrical outer surface.

8. The torque tight locking device of claim 1 wherein said outer member second cavity has a partially cylindrical shape.

9. The torque tight locking device of claim 1 further comprising recesses defined in said ends of said inner member for receiving prongs of a nut rotation adjustment tool.

10. The torque tight locking device of claim 1 further comprising recesses defined in said ends of said outer member for receiving prongs of a nut rotation adjustment tool.

11. The torque tight locking device of claim 1 further comprising scribings defined on the faces of said inner and outer members to provide visual indications of relative seal compression.

12. The torque tight locking device of claim 1 further comprising means for controlling minimum spacing between the first and second nuts to prevent over compression of the seal.

13. The torque tight locking device of claim 12 wherein said spacing control means comprises a shoulder defined in said inner member.

14. The torque tight locking device of claim 12 wherein said spacing control means comprises a second open-sided cavity formed in said second end of said inner member, said second cavity having a cross-sectional shape sized to prevent passage of the first nut and a thickness sized to correspond to selected minimum spacing between the first and second nuts.

15. The method of preventing relative rotation between first and second nuts in a face seal assembly having an axis and a radius joining separate fluid transmission lines, the method comprising the steps of:

(a) sliding an inner member having a cavity sized to non-rotatably receive the first assembly nut and an open slotted side sized to slidably receive the first nut radially over the first assembly nut;

(b) sliding an outer member having a first cavity sized to non-rotatably receive the second assembly nut and an open slotted side sized to slidably receive the second nut radially over the second assembly nut;

(c) sliding said outer member axially toward said inner member, said outer member receiving said inner member in a second cavity therein sized to rotatably receive said inner member; and (d) securing said outer member non-rotatably to said inner member.

* * * * *